July 11, 1967

W. C. CORNELL 3,330,248

FLOW RESPONSIVE INDICATOR

Filed Dec. 11, 1963

INVENTOR.
WILLIAM C. CORNELL

BY *Hoppe and Mitchell*

*his* ATTORNEYS

| United States Patent Office | 3,330,248 |
|---|---|
| | Patented July 11, 1967 |

3,330,248
FLOW RESPONSIVE INDICATOR
William C. Cornell, 1040 Adrienne Drive,
Alamo, Calif. 96507
Filed Dec. 11, 1963, Ser. No. 329,794
5 Claims. (Cl. 116—70)

This invention relates generally to flow responsive indicators and more particularly to devices for indicating the pressure condition inside a pressure vessel such as the crankcase of an internal combustion engine. A principal application of the invention is as a testing device for indicating the operating condition of relief valves in anti-smog devices applied to automotive engines.

Many states have recently passed laws requiring anti-smog devices to be installed on all new automobiles sold in those states. These laws have, among other things, required the use of positive crankcase ventilators which connect the crankcase of the engine with the intake manifold so that any blow-by fumes in the crankcase are sucked back into the engine and burned.

Such devices employ a check valve to prevent any backfires from burning back into the crankcase where an explosion might occur. If this check valve does not function properly but becomes stuck in a closed position, the pressure inside the crankcase may increase to a point where breakdown of the engine oil seals and a complete loss of crankcase lubricant may occur. If the loss of lubricant is not detected in time, serious injury to the engine may result. Inasmuch as the blow-by fumes from the crankcase contain a high quantity of gums, tar, varnishes and condensible gases, these check valves are very prone to failure because of an accumulation of such substances. Accordingly, a major maintenance objective on engines equipped with such devices is the detection of excessive pressure build up in the crankcase resulting from the malfunctioning of the check valve.

The invention has for its object the provision of a simple, inexpensive but dependable test device that can be easily used to give an instantaneous check on pressure conditions in the engine crankcase. A further object of the invention is that the device be simple to use and applicable to cars of all makes without modification. Still another object of the invention is that the device have few moving parts and be long lasting in service.

A presently preferred embodiment of the invention is shown in the accompanying drawings and, for the purpose of illustrating one way in which the invention may be practiced, will be described in detail hereinafter. It is to be understood, however, that the following description is by way of example only and is not intended to define or restrict the scope of the invention, the clams appended hereto, together with their lawful equivalents, being relied upon for that purpose.

Figure 1:
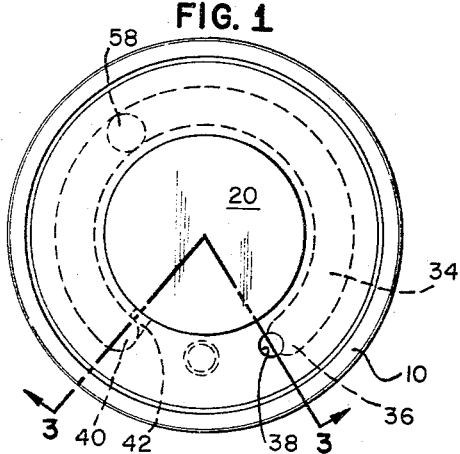
Figure 2:
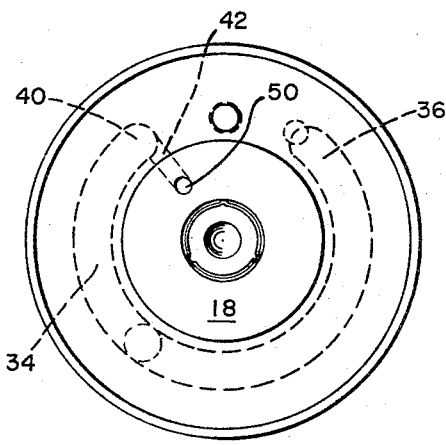
Figure 3:
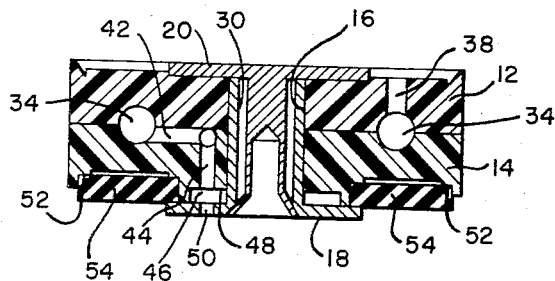
Figure 4:
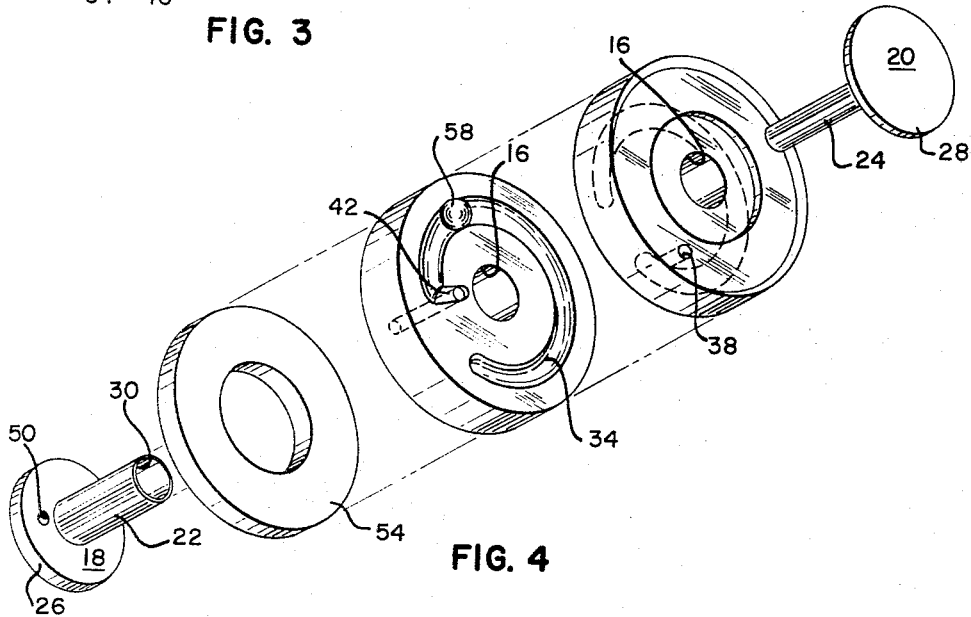

Of the drawings:
FIG. 1 is a top plan view of a device constructed in accordance with the teachings of the invention;
FIG. 2 is a bottom plan view of the device shown in FIG. 1;
FIG. 3 is a sectional view through the device taken along the line 3—3 in FIG. 1 looking in the direction of the arrows; and
FIG. 4 is an exploded perspective view showing the component parts of the device.

As will be seen by reference to the drawings, the device, in preferred form, resembles a hockey puck in shape and size. The cylindrical body 10 of the device is formed in two parts 12, 14 from a transparent plastic material so that the inner portions of the device can be visually observed from the outside. A central opening 16 is provided through the two body parts 12, 14 and the parts are secured together by means of flanged fastening pins 18, 20. Each fastening pin has a hollow cylindrical section 22, 24 that ends in a circular flange 26, 28. The cylindrical section 22 of the lower pin 12 shown in FIG. 3, has an opening 30 passing completely through the pin 18 and the diameter of the opening 30 is greater than the outer diameter of the cylindrical section 24 of the upper pin 20 so that the latter may fit within the former. When the two pins 18, 20 are inserted from opposite sides into the central opening 16 formed in the body parts 12, 14, the cylindrical section 24 of the upper pin 20 is thus able to telescope into the cylindrical section 22 of the lower pin 18. The end 32 of the upper pin 20 is then pressed over the outer end of the opening 30 in the lower pin 18 and the two parts of the body 12, 14 of the device are thereby joined together.

Internally of the device there is formed an arcuate passageway 34. The passageway 34 extends throughout substantially the greater part of the body but is not completely circular so that the passageway 34 has closed ends. One end 36 of the passageway 34 is connected to the atmosphere by an intersecting vertical passageway 38 formed in the upper body part 12. The opposite end 40 of the arcuate passageway 34 is connected with a short lateral passageway 42 extending radially inwardly toward the center of the body. This lateral passageway 42, is, in turn, connected to an intersecting vertical passageway 44 opening upon an annular recess 46 formed in the lower face 48 of the body part 14 immediately adjacent the central opening 16. A port 50 formed in the flange 26 of the lower fastening pin 18 communicates the recess 46 with the exterior of the device at a point adjacent its center. A lightweight ball 58 is positioned within the passageway 34 and is movable therealong in reseponse to the flow of air therethrough.

The lower, or underneath face of the device (as seen in FIG. 3) is provided with a second annular recess 52 that is concentric with the recess 46 but positioned outwardly thereof so as to be adjacent the outer periphery of the lower body part 14. Mounted within the recess 52 by any suitable means is a continuous sealing means in the form of a compressible gasket ring 54 of appropriate material such as rubber or the like. As is best seen in FIG. 3, the annular gasket ring 54 completely surrounds the recess 46 and the exterior port 50 formed in the flange 26 of the lower fastening pin 18 so that the port 50 lies within the gasket ring while the passageway 38 lies without the gasket ring 54. The inner wall of the recess 52 has a clearance space 56 which serves to accommodate the displaced portion of the gasket ring 54 whenever the gasket ring is placed in compression by downward application to the oil inlet opening of an automotive engine in a manner to be described hereinafter. The gasket ring 54 is maintained within the recess 52 by the flange 26 of the pin 18 which flange overlaps the inner edge of the ring as shown in FIG. 3.

In operation, the device can be used to give a substantially instantaneous check on the pressure condition of the crankcase. The cap for the oil intake port of the engine is first removed and the device placed over the open port in such a way that the annular gasket ring 54 effects a pressure-tight seal with the rim of the port. This is done while the engine is idling. With the body of the device held over the oil intake port, the internal arcuate passageway 34 is thus communicated, on the one hand, with the crankcase through the passageways 42 and 44 and the exterior port 50 in the flange 26 of the lower fastening pin 18 and, on the other hand, with the atmosphere through the passageway 38 which opens onto the upper surface of the device.

If the check valve in the by-pass line connecting the crankcase with the inlet manifold for the engine is functioning properly, the crankcase pressure will be less than atmospheric. Accordingly, a pressure differential will exist in the arcuate passageway 34 of the device which will cause air from atmosphere to flow through the passageway in a counterclockwise direction when viewed in FIG. 1. This flow of air will move the ball indicator 58 toward the left hand end 40 of the passageway (again as viewed in FIG. 1) and this movement will be observed through the transparent plastic body 10. The observer will then know that the crankcase pressure condition is satisfactory and that the check valve must be functioning properly.

If the check valve is stuck in the closed position, the pressure in the crankcase will rise immediately as the engine idles. The pressure in the crankcase will soon exceed atmospheric pressure. Accordingly, there will be a pressure differential in the internal arcuate passageway 34 of the device, causing an air flow in the clockwise direction (as the device is viewed in FIG. 1). This air flow will move the ball indicator 58 toward the right end 36 of the passageway and the observer noting this movement through the transparent plastic body 10 of the device will know that the check valve is not functioning properly and should be replaced.

The width of the gasket ring 54 is sufficient to accommodate variously-sized oil intake ports so that the device can be used with different makes and models of cars without modification.

What is claimed is:

1. A portable air flow responsive device for detachable association with the crankcase of an automobile engine for indicating the operating condition of relief valves in a crankcase ventilating unit, said device comprising a flat, cylindrical, transparent body portion having flat opposed faces and an internal arcuate passageway formed therein between the opposed faces of said body portion that can be viewed through the body portion, first conduit means extending from one face of said body portion to the internal passageway adjacent one end thereof forming an air passageway from the face of said body portion to said passageway, gasket means on the face of the body portion having said first conduit means for detachable engagement with the crankcase of an automobile engine to form a pressure-tight junction therewith, second conduit means extending from the opposite face of said body portion to the internal passageway adjacent the other end thereof forming an air passageway from the opposite face of the body portion to said passageway, a movable member positioned in the internal passageway between said first and second conduit means and movable within said passageway in response to the flow of air therethrough, said member moving in one direction if the pressure in the crankcase entering the air passageway of said first conduit means is greater than atmospheric pressure and said member moving in the opposite direction if the pressure in the crankcase entering the air passageway of said first conduit means is less than atmospheric.

2. An air flow responsive device as set forth in claim 1 wherein said gasket means are annularly shaped.

3. An air flow responsive device as set forth in claim 2 wherein said body portion comprises two mating parts having split faces along a plane substantially at right angles to the axis of said body portion with the arcuate passageway formed by the faces of said parts, one end of said passageway being communicated to the atmosphere through one body part and the other end of said passageway being communicated to a point within the sealing means through the other of said two body parts.

4. An engine crankcase pressure tester for comparing the air pressure within an engine crankcase to the ambient atmospheric pressure, comprising: a transparent body member adapted to be sealed to a crankcase opening and having a hollow tubular chamber defining an arcuate path having first and second path end portions relatively adjacent each other; said body member having first and second ports in effective air passage communication between, respectively, such first path end portion of said tubular chamber and such crankcase opening, and such second path end portion of said tubular chamber and the ambient atmosphere; and indicator means of spherical configuration disposed within said chamber and adapted for movement along said path, said indicator means being in at least partially obstructing relationship to air passage through said chamber between said ports whereby the location of said indicator means with respect to said path corresponds to an air flow condition between said ports for visual indication of such condition.

5. In a pressure-vacuum gauge for testing a positive crankcase ventilating system of an automobile engine having an oil filling opening therein in communication with such crankcase, the combination comprising: a casing including a top-wall; an inner panel mounted within said casing along said top-wall; said inner panel and said top-wall defining a hollow, arcuate configuration enclosing an elongate, arcuate channel, said hollow configuration having a spaced pair of vapor-admitting apertures therein, said top-wall having a transparent portion intermediate said apertures; a ball indicator disposed in said arcuate channel for movements between said apertures beneath said transparent portion; a bottom closure member on said casing, said bottom closure member having pliable portions for sealing engagement with such oil filler opening when testing the pressure condition of such crankcase, said pliable portions surrounding an opening in said closure member permitting vapor communication from such crankcase to said channel through said apertures.

References Cited

UNITED STATES PATENTS

| | | | |
|---|---|---|---|
| 2,655,894 | 10/1953 | Rabbitt | 116—117 |
| 3,071,914 | 1/1963 | Gesmar | 116—117 |
| 3,119,369 | 1/1964 | Harland et al. | 116—112 |

LOUIS J. CAPOZI, *Primary Examiner.*